Figure 1:
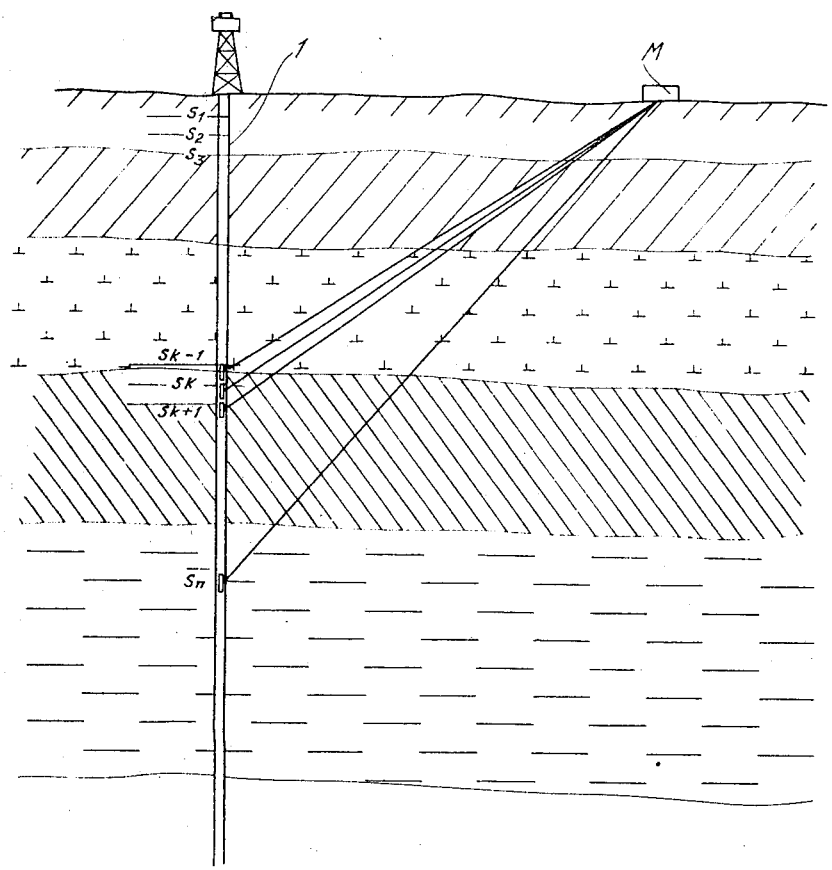

United States Patent
Gabillard et al.

[15] 3,690,164
[45] Sept. 12, 1972

[54] PROCESS FOR PROSPECTING OF THE GROUND LAYERS SURROUNDING A BOREHOLE

[72] Inventors: Robert Gabillard; Francois Louage, both of Lille; Robert Desbrandes, Sevres, all of France

[73] Assignee: Institut Francais du Petrole, des Casburants et Lubrifiants, Hauts de Seine, France

[22] Filed: June 24, 1969

[21] Appl. No.: 836,020

[30] Foreign Application Priority Data

June 24, 1968 France..................68156220
June 24, 1968 France..................68156232

[52] U.S. Cl. .............73/151, 73/152, 181/0.5, 324/6
[51] Int. Cl. ..........................E21b 47/026
[58] Field of Search..........324/6, 1, 10; 73/151, 152, 73/153

[56] References Cited

UNITED STATES PATENTS

| | | |
|---|---|---|
| 2,992,325 | 7/1961 | Lehan..................324/6 X |
| 3,350,634 | 10/1967 | Hoehn, Jr...............324/6 |
| 2,657,380 | 10/1953 | Donaldson............324/6 X |

Primary Examiner—Richard C. Queisser
Assistant Examiner—Marvin Smollar
Attorney—Craig and Antonelli

[57] ABSTRACT

To determine physical characteristics of successive ground strata, signals are transmitted from successive depth locations in a borehole and received at a surface location spaced from the location of the borehole. The successively transmitted and received signals are compared with signals indicative of the known characteristics of one of the strata layers to determine the characteristics of the other strata through which the successively transmitted signals have traveled.

14 Claims, 3 Drawing Figures

INVENTORS
ROBERT GABILLARD, FRANÇOIS LOUAGE and
ROBERT DESBRANDES

PROCESS FOR PROSPECTING OF THE GROUND LAYERS SURROUNDING A BOREHOLE

The present invention pertains to a new process for prospecting of the ground layers surrounding a borehole.

The processes which are currently used for prospecting of the geological layers traversed by a borehole are generally based on the measurement of the electrical resistivity of the ground or are acoustical processes wherein is measured the velocity of propagation of elastic waves through these geological layers.

The processes based on resistivity measurements consist in lowering into the borehole, a resistivity measuring sonde, which generally includes four electrodes, before the borehole has been provided with a metallic casing.

The operation of this sonde is well known in the art and there exist various embodiments of such a sonde.

This type of sonde makes it possible to obtain a recording of the ground resistivity as a function of depth, called a resistivity log.

The resistivity log, when considered together with other logs derived from other prospecting methods, makes it possible to determine the nature of the ground layers traversed by the borehole and to locate in particular the oil-bearing formations.

The drawback of such a method is that it only provides local resistivity measurements.

The radius of exploration of conventional sondes around the borehole or distance of penetration of the transmitted signals into the ground is generally not greater than some meters. It results therefrom, in particular, that a stratigraphic oil trap, such as a lens of oil-impregnated sand, may not be detected, although the borehole is located at a relatively small distance from this lens.

The processes using acoustic techniques have a still more limited radius of exploration.

The main object of the invention is accordingly to provide a process which makes it possible to obtain a log of the grounds surrounding the borehole with a sufficient radius of exploration and allowing the location of a geological discontinuity in the vicinity of the borehole, while providing a precise mapping of this discontinuity.

This object is achieved, according to the invention with a process for determining properties of the ground layers surrounding a borehole drilled in the ground, comprising the steps of transmitting an electrical or acoustical signal into the ground, said signal being propagated through the ground layers between the borehole and the ground surface, measuring in at least one receiving point in spaced relationship to the transmitting point a parameter corresponding to said transmitted signal and characterizing a physical property, such as an electromagnetic or acoustical property of the ground, between the transmitting point and the receiving point, one of said transmitting and receiving points being stationary substantially at the ground surface and the other being displaceable along the borehole, said parameter being for example the time of propagation of the signals between said transmitting and said receiving points or the measurement of the electric and / or magnetic field produced at the receiving point by the transmission of a signal of a given amplitude, or also the value of the intensity of the signal reaching the receiving station, in the case of an acoustic signal.

The process according to the present invention involves a step-by-step process in which a parameter for an initial geological layer is determined and this initial parameter is then used as a basis for the successive determination of variations in the parameter for other sub-surface layers.

For example, where the determination of a parameter such as conductivity of a layer is to be carried out, one must first know the parameter, e.g. conductivity, of a standard or reference layer. Using this reference parameter as a standard, it is then possible to derive the same parameter for different sub-surface layers by making characteristic measurements and employing the results of these measurements into a particular equation, from a sonde lowered into a borehole at a first location, for example, signals are transmitted through the first or surface ground layer to a receiving point. From measuring equipment at the receiving point, the conductivity of the first layer can be readily determined. As the sonde is successively lowered in incremental steps down into the borehole, measurements are taken as signals are transmitted from successive locations. Each time a signal is transmitted and received, a determination of the parameter of the layer through which the signal has traveled from the transmitter to the receiver can be made.

When the sonde transverses the borehole and crosses a region from one ground layer to another, whose parameter being measured is different from that of the first ground layer, characteristics of the received signal are compared with those of the first signal by employing a particular equation. By solving the equation through the use of the known parameter of the first layer, the conductivity of the second or additional layers below the first layer can be determined. In other words, once the parameter of the first layer has been determined, one can determine this parameter for the second layer, which then permits the determination of the parameter for the third layer which, in turn, permits the parameter to be determined for the fourth layer, etc.

The process according to the present invention, thus, permits the determination of properties of the ground by reoccurrence for, known properties of a first ground layer, along the borehole, by effecting a first measurement corresponding to the propogation of a transmitted signal through the first layer and then effecting at least one further measurement corresponding to the propogation of the signal through the first layer and at least one further ground layer located adjacent to the first layer.

For a plurality of points within a single layer, the average of the measured parameter is taken as a reference value. Once the average value of the measured parameter is known for a first ground layer, the determination or calculation of a log representing the variations of this parameter for the other ground layers is readily determined by the step-by-step measuring process along incremental positions within the borehole. This log, of course, depicts the mapping of the variations of the parameter as a function of depth, the sonde being positioned at different depths during the measurement process.

Thus, the present invention involves the combination of a plurality of steps for the determination of physical characteristics of sub-surface ground layers. The initial steps include the steps of transmitting signals from a sonde within a borehole and receiving the signals at a detector station spaced from the borehole. Repeated transmission and receptions take place for the respective depth positions of the sonde. The signals which are received are characterized by the ground layers through which they have traveled. These signals are then analyzed, whereby a specific parameter of a sub-surface layer may be detected. Once the parameter of one of the layers, usually the first or surface layer, is known, the additional steps of the process of the present invention are carried out. Namely, the signals detected for any particular sonde position are analyzed and the resultant values representing the signals are employed, together with the values representing the characteristic of a previous ground layer in a specific derivation, or characteristic equation, whereby the parameter of a specific sub-surface layer may be determined. It can be seen, therefore, that the process of the present invention involves the steps of successively transmitting and receiving, detecting and deriving.

According to a non-limitative embodiment, the process according to the invention comprises the step of transmitting into the ground a low frequency alternating current, for example by means of two electrodes carried by a sonde which is vertically displaceable along the borehole. This sonde constitutes what the radio electricians call a vertical electric dipole.

It is well known that the electric current which is so-transmitted into the ground then flows through the different ground layers by radiating all around the transmitting dipole. When this current reaches the ground surface it produces there a radial electric field, i.e. a field the direction of which passes through the axis of the borehole and which is detected in the form of a voltage difference between two pins driven into the ground and located along a radial direction.

This electric field is associated with a horizontal magnetic field which is perpendicular and proportional to the electric field and which may be used together with this electric field for carrying out the process according to the invention.

Before it can reach the ground surface the electric current has been reflected many times by the various interfaces which separate the different layers constituting the underground.

It is therefore apparent that the magnitude of the electric and/or magnetic field at the ground surface will be determined by the underground structure.

The process according to the invention makes use of this physical phenomenon for mapping the underground structure.

For this purpose is recorded in a continuous manner the magnitude of the radial electric field $E_r$ and/or of the horizontal magnetic field $H_p$ which are produced at the ground surface at a distance $r$ from the borehole, is recorded in continuous manner as a function of the depth $z$ of the sonde. There is thus obtained a curve $E_r(z)$ similar to a resistivity log.

The receiving apparatus is so built as to also provide accurately the first and second derivatives of $Er(z)$ with respect to $z$.

Measurements of $E_r(Z)$ and of the first and second derivatives thereof with respect to depth $z$ make it possible to build a resistivity log.

Figure 2:
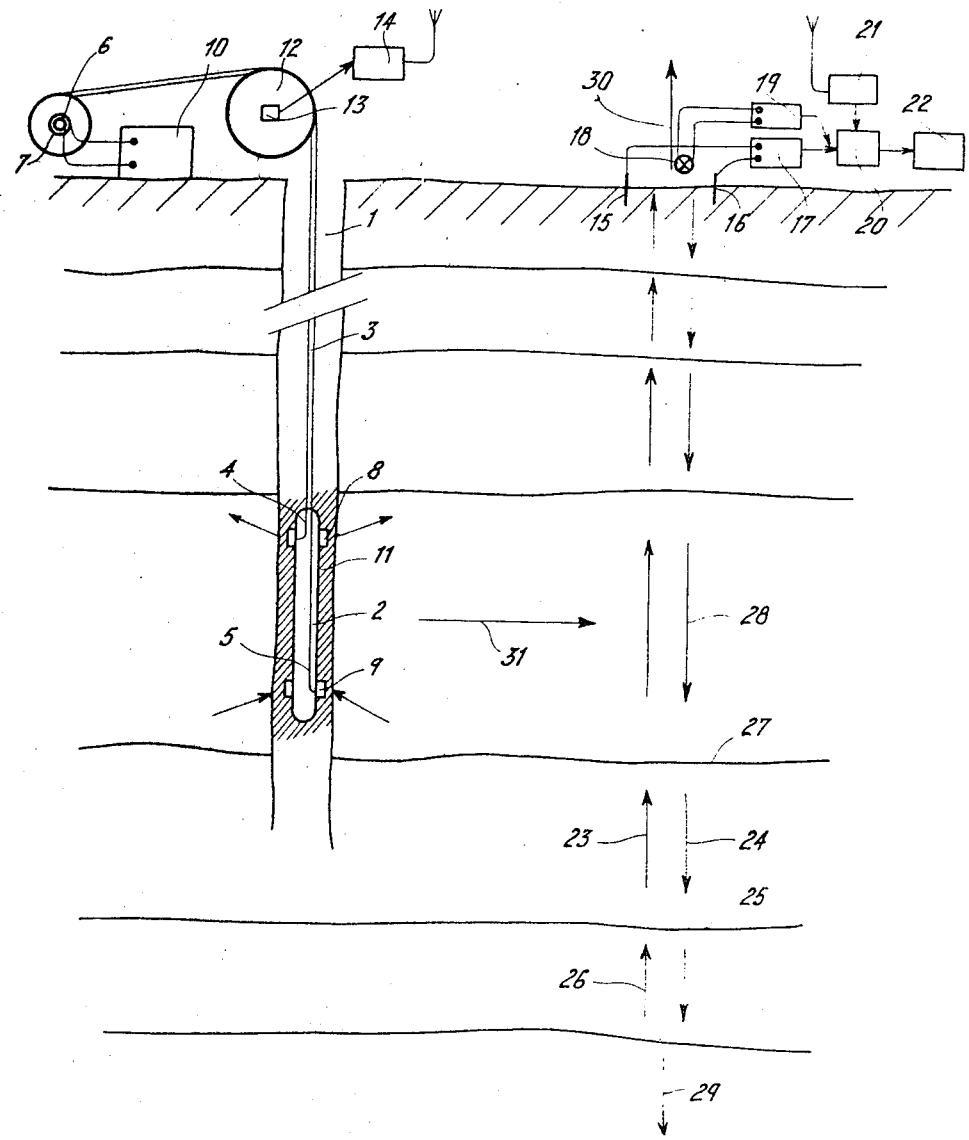
Figure 3:
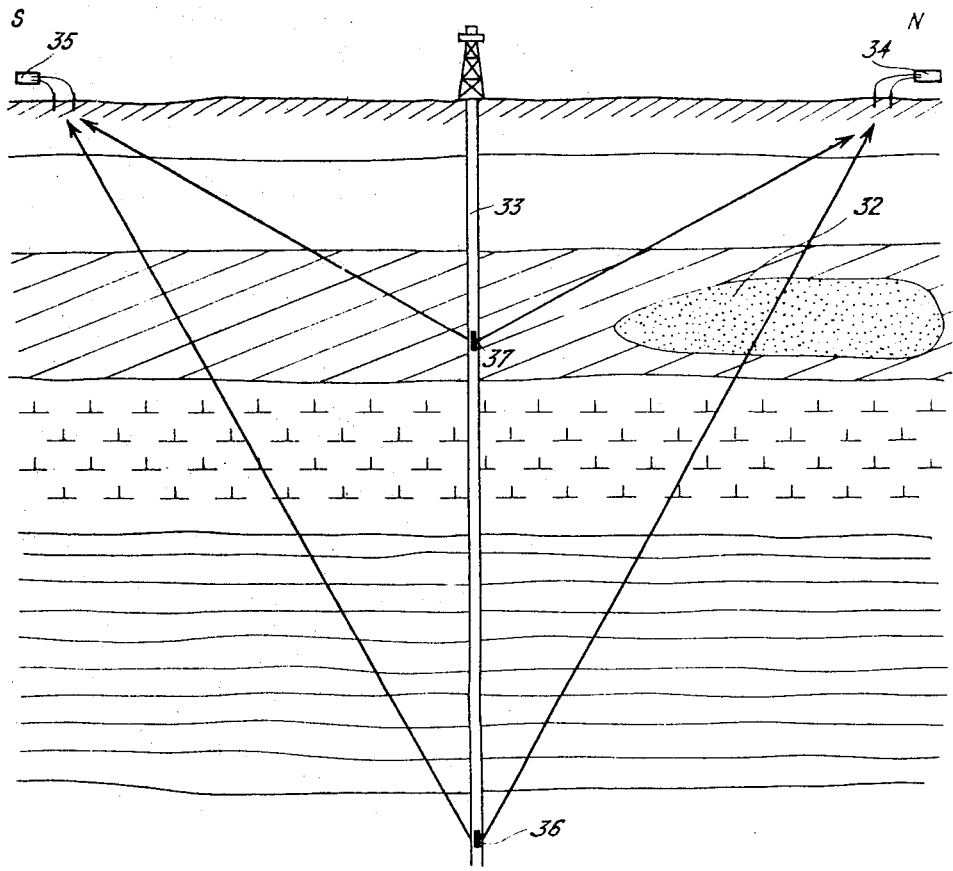

Non-limitative embodiments of the invention will be described hereinunder with reference to the accompanying drawings, wherein FIG. 1 is a diagram illustrating the process according to the invention, FIG. 2 diagrammatically illustrates by way of example only, a type of apparatus which is adapted for carrying out this process, FIG. 3 shows an embodiment of the invention used for detecting a lens of oil-impregnated sandstone located in the vicinity of a borehole which has not traversed this lens.

FIG. 1 shows a borehole drilled through the ground, traversing successive geological layers.

From a sonde which is successively placed at levels $S_1, S_2, S_3 \ldots S_{k-1}, S_k, S_{k+1} \ldots S_n$ in the borehole, signals are transmitted into the ground for example electric signals, by means of electrodes which contact the borehole wall or by means of induction coils.

These signals may either be constituted of successive pulses or of an alternating current the frequency of which may between 10 Hz and 1 k Hz.

At a receiving station M at the ground surface a parameter, corresponding to the transmitted signals and characterizing an electric or electromagnetic property of the ground between the transmitting and the receiving points is determined.

This parameter may, for example, be the time interval elapsing between the time of transmission of an electric pulse into the ground from the sonde and the time of reception of this pulse by M, this time interval being inversely proportional to the average value of the speed of propagation of the pulse through the ground layers separating the point of transmission from the point of reception. It would also be possible, without departing from the scope of the invention, to transmit from the borehole acoustic waves detected at station M after they have travelled through the ground. The parameter measured at station M may also be constituted by one or more components of the electric and / or magnetic field produced at the ground surface as a result of the transmission of an alternating current or of electric pulse into the ground, the measured field being a function of the average electric conductivity of the ground layers separating the point of transmission and the point at which the measurements are effected.

Irrespective of the parameter which is measured at station M, measurements are carried out for successive levels $S_1, S_2, S_3 \ldots S_{k-1}, S_k, S_{k+1} \ldots S_n$ occupied by the sonde in the borehole, these levels limiting successive ground layers which may or not be of the same geological nature.

According to the invention, there are deduced from the respective values measured at M, on the ground surface, for the locations $S_{k-1}, S_k$ and $S_{k+1}$ of the sonde, variations, successively introduced by the ground layers between the levels $S_{k-1}$ and $S_k$, $S_k$ and $S_{k+1}$, in the average value of the parameter which characterizes the ground layers located between the sonde and the measuring point. This parameter may be for example, the speed $v$ of propagation of the electrical or acoustical signals, or the electric resistivity $\sigma$ of these ground layers; the average value of $v_k$ or $\sigma_k$ of this parameter corresponding to the position $S_k$ of the sonde being expressed as a function of the value $v_{k+}$ or $_{-k-1}$ corresponding to the position $S_{k-1}$ of the sonde.

Similarly $v_{k+1}$ or $\sigma_{k+1}$ (corresponding to the position $S_{k+1}$) will be expressed as or function of $v_k$ or $\sigma_k$ and so on for successive levels of the sonde in the borehole, which makes it possible, when the average of the parameter such as $\sigma$ or $v$ is known for a particular layer of the ground, particularly for a layer close to the ground surface, to build step by step a log representing the variations of the considered parameter, as a function of depth.

In FIG. 2 reference numeral 1 designates the borehole wherein is suspended a sonde 12, from a flexible line or cable 3. This flexible line includes two electrical conductors (indicated by 4 and 5 inside the sonde) which carries the electric current from the two conducting rings 6 and 7 of the winch on which the flexible line is stored to the two annular electrodes 8 and 9 located on the sonde. The rings 6 and 7 are connected to a generator 10 of alternating current, the frequency of which may vary between 10 Hz and 1 kHz and whose power may be between 1 kw and 10 kw, according to the nature of the ground layers and the depth of the borehole. For example, a power of 3 kw will generally be quite sufficient for a borehole having a depth of 600 meters and drilled through a ground of average resistivity.

Under these conditions the current of the generator flows to the electrodes 8 and 9 and is transmitted therefrom into the ground through the drill mud 11.

In order to obtain a log, the sonde is slowly raised along the borehole by reeling the flexible line 3 on its storing winch. A device 13 of a known type provides a pulse each time the sonde has been raised over a height $h$(chosen as a function of the ground and for example of the order of 1 meter or less).

This pulse is transmitted from a radio-transmitter 14 to the receiving device. The electrical resistance between terminals 6 and 7 varies as a function of the resistivity of the ground formation wherein the sonde is located. The generator may either be so constructed as to deliver a current of constant amplitude, irrespective so the variation in the resistance of its load circuit, or have a variable output current and be then provided with a device measuring the amplitude of this current and transmitting continuously the value of this amplitude by means of the radio-transmitter 14 to the receiving device, so as to make it possible to affect automatically the necessary corrections by relating the intensity of the measured signal to the intensity of the received signal (the correction system, which may be of any known type, has not been shown on the drawing).

The receiving device, which may be installed on a truck includes two metallic pins 15 and 16 driven into the ground and located, for example, at a distance of about 10 meters from each other.

They are located on a straight line passing through the borehole axis and separated therefrom by a distance which may be between 100 meters and more than 1 kilometer. These pins are connected to an amplifier 17 provided with an electronic system enabling the precise determination of one or more components of the electrical field prevailing at the ground surface.

The result of this measurement may appear at the output of the amplifier 17 either in analog form (direct voltage having an amplitude proportional to the intensity of the field) or in digital form (known combination of coded pulses).

It would also be possible to measure the magnetic field by means of the coil 18 and the amplifier 19, substantially identical to the amplifier 17 using the measurement of the magnetic field either in association with or in lieu of the measurement of the electric field.

The measurement of the electric or of the magnetic field (or of both) derived from the amplifier 17 or / and 19 is utilized by a computer 20 which may be of the analog or numerical or composite type, according to the technological embodiment selected for carrying out the invention. This computer also receives an information relative to the depth of the sonde, through the radio-receiver 21.

The data utilized by the computer 20 are then recorded by recorder 22 which may be a magnetic recorder or a recorder provided with a recording pen, or any other type of recorder.

The manner in which the measurement of the electric field and/or that of the magnetic field and of the two first derivatives thereof, as a function of the depth of the sonde, may be utilized according to the invention, so as to provide the equivalent of a resistivity log, is indicated hereinunder after a brief theoretical statement.

The flow of electric current through the different strata of the sedimentary formation may be described by the propagation of different waves.

In each ground layer, a wave 23 rises toward the ground surface and a wave 24 travels downwardly.

The rising wave 23 results partly from the reflection of the downwardly travelling wave 24 on the lower interface 25 of the considered ground layer and partly from the transmission through said interface of the wave 26 rising from the lower layer.

The downwardly travelling wave 24 results partly from the reflection of the rising wave 23 on the upper interface 27 of the considered ground layer and partly from the transmission through said interface of the downward waVe 28 travelling down from the upper ground layer.

The two end layers of the stratification, i.e. respectively the atmosphere and the primary bedrock, which are supposed to have an infinite thickness, differ from the other layers in that they are traversed byonly one wave, only the rising wave 30 in the case of the atmosphere.

It is this wave 30 which finally energizes the devices which detect respectively the electric field (sticks 15 and 16) and the magnetic field (coil 18) located at the ground surface. There exists moreover in the ground layer, wherein the sonde is located at a given instant, a primary wave 31 which is directly related to the current delivered by the generator 10 and transmitted into this ground through the electrodes 8 and 9 of the sonde 2. It is this primary wave which gives rise to all the other waves.

In the following are determined the relations between all the waves, such as waves 23 and 24 and in particular wave 30 in the atmosphere, with the primary wave 31, the amplitude of which is known.

To this end we use the Hertzian potential which is a well-known concept for those who are familiar with the study of the electromagnetic waves. When the Hertzian potential has been determined, it is easy to deduce therefrom the respective magnitudes of the electric and magnetic fields.

In each layer of the ground formation, the Hertzian potential is given by an integral of the type.

$$\pi_m = \int_0^\infty (a_m e^{-u_m z} + b_m e^{u_m z}) \tau_0(\lambda r) d\lambda \quad (1)$$

with $$u_m = \sqrt{\partial^2 + \gamma_m^2} \quad (2)$$

$m$ — is the index of the ground layer, $\gamma_m$ is the factor of propagation, $\tau_o$ is the Bessel function of the first kind, $r$ — is the radial distance between the receiving point and the borehole axis and $z$ the depth, $a_m$ is the amplitude of the rising wave and $b_m$ that of the downwardly travelling wave. As a consequence of the above remark, concerning the end layers of the stratification $b_o = o$ (no downwardly travelling wave in the atmosphere) and $a_m = o$ (no rising wave of the primary bedrock), O and M being the respective indices of the end layers : atmosphere and primary bedrock.

In the layer wherein is located the transmitting sonde and which is quoted with the index n, there is also the primary wave 31.

Thus the Hertzian potential in this layer is given by a formula of the type :

$$\pi_n = \int_0^\infty \left[\frac{\rho \lambda}{u_n} e^{\pm u_n z} + a_n e^{-u_n z} + b_n e^{u_n z}\right] \tau_0(\lambda_r) d\lambda \quad (3)$$

with $$\rho = \frac{Il}{4\pi(\delta_n + \tau \omega \epsilon_n)} \quad (4)$$

I being the intensity of the current supplied by the generator 10 and $l$ the spacing between the two electrodes 8 and 9. $\sigma_n$ is the conductivity of the layer $n$ and $\epsilon_n$ its dielectric coefficient.

Generally $\sigma_n$ is much greater than the product $\omega \epsilon_n$

The problem to be solved is to express as a function of $l$ the (2 M - 2) unknown amplitudes $a_o; a_1, b_1; a_2, b_2; \ldots a M\_1, b_{m-1}; b_M$ For this purpose are available the limit conditions of the Maxwell equations, postulating the equality of the tangential components of the field on both sides of each interface, thus providing 2 M independent equations between the $a_n$ and the $b_n$ coefficients.

The problem has thus theoretically a solution.

By following the above-indicated method and after fairly extensive calculations, the following expression is obtained for the Hertzian potential $\pi_o$ in the atmosphere.

$$\pi_o(n) = P \int_0^\infty \frac{N_{22}(n) + N_{12}(n)}{u_n \Delta(n)} \frac{\tau_0(\lambda r) \lambda d\lambda}{M_{11}} \quad (5)$$

The index n indicates that the transmitting sonde is located in the layer $n$. $\pi_o(n)$ is thus a function of the vertical position of the sonde.

In this integral, $u_n$ has the above-defined meaning and $\Delta(n)$ is the determinant of the matrix $$N(n) = \begin{pmatrix} N_{11}(n) & N_{12}(n) \\ N_{21}(n) & N_{22}(n) \end{pmatrix} \quad (6)$$

$M_{11}$ is the first diagonal element of another matrix which does not depend on the position of the transmitting sonde. $M_{11}$ is thus a constant.

The calculation of the elements of the matrixes M and $N(n)$ is theoretically possible, but M the knowledge of the thicknesses $h_n$ of all the layers, of their conductivity $\sigma_n$ and eventually of their dielectric constant $\epsilon_n$. These data are not known (they must precisely be determined) and therefore the calculation of the integral giving the Hertzian potential $\pi_o(n)$ would seen at first sight impossible.

The two following observations makes it possible to give a solution to the problem thus pending.

The first of these observations is that, irrespective to the thicknesses $h_1, h_2 \ldots h_N$ of the successive ground layers, it is always possible to find them a common divider $h$. It is sufficient to this end to select $h$ small enough. The geological formation may thus be considered as being constituted by a stacking of N − 1 layers of identical thickness $h$, the layers O (atmosphere) and N (bedrock) having an infinite thickness.

When two of these imaginary layers will be located within the same geological layer, their conductivities and dielectric constants will simply be identical.

Considering then two successive positions of the sonde, one at the depth $Z_n = nh$, the other at the depth $Z_{n-1}(n=1)h$, the electric field generated at the ground surface when the sonde is at the depth $Z_n$ will be given by the formula $$E_n = (\delta/\delta r)(\delta/\delta z) \pi_o(n) \quad (7)$$

wherein $\pi_o(n)$ is the Hertzian potential given by the relation (5)

When the sonde will be located at the depth $Z_{n-1}$ the electric field $E_{(n-1)}$ will be given by the formulae (7) and (5) by substituting therein the index $n - 1$ for the index n.

The second observation is that there exist simple relations of recurrence between the elements $N_{ij}(n)$ of matrix $N(n)$ and the elements $N_{ij}(n-1)$ of matrix $N(n-1)$ One may write, for example:

$$\frac{N_{22}(n-1) + N_{12}(n-1)}{u_{n-1}\Delta(n-1)} = \frac{e^{u_n h} N_{22}(n) + e^{-u_n h} N_{12}(n)}{u_n \Delta(n)} \quad (8)$$

This gives for the expression of the derivative of the electric field at the receiving point on the ground surface, with respect to the depth $Z_n = nb$ of the sonde.

$$\frac{dE(Zn)}{dz} = \left[\frac{E(n) - E(n-1)}{h}\right]_{h \to 0}$$
$$= \rho \int_0^\infty \mu_0 \times \frac{N_{22}(n) - N_{12}(n) \tau_1(\lambda r) \lambda^2 d\lambda}{\Delta(n) M_{11}} \quad (9)$$

If the expression of the second derivative of $E_n$ is calculated by using again the relations of recurrence, there is obtained, assuming that $h$ is small:

$$\ddot{E}_n = \frac{1}{h}\left(1 - \frac{\sigma_{n-1}}{\sigma_n}\right)\dot{E}_n + \frac{\sigma_{n-1}}{\sigma_n}\left[\gamma \frac{2}{n}\frac{\partial}{\partial r}\frac{1}{r}\frac{\partial}{\partial r}r\right]E_n \quad (10)$$

wherein $\dot{E}_n = 1/h\,[E_n - E_{n-1}]$ $\ddot{E}_n = 1/h\,[\dot{E}_n - \dot{E}_{n-1}]$, $\ddot{E}_n = 1/h^2\,[E_n - 2E_{n-1} + E_{n-2}]$ In the above formula $\sigma_n$ is the conductivity of the ground at the depth $Z_n = nh$ and $\sigma_{n-1}$ is the conductivity at the depth $Z_{n-1} = (n-1)h$, $h$ being the spacing between two successive positions of the sonde for which a field measurement is effected and $r$ being the distance separating the measuring station from the borehole axis.

In the embodiment of the invention illustrated by FIG. 2, the computer 20 is so designed as to continuously deliver the experimental functions $\dot{E}(Z)$ and $\ddot{E}(Z)$. These functions are recorded by recorder 22.

By introducing the values of these functions in the relation 10, it becomes thus possible to determine the contrasts in the conductivity of the ground layers successively traversed by the sonde and spaced by the interval $h$. It is thus possible to build step by step a conductivity log, assuming that the conductivity of the ground layers adjacent the ground surface is already known.

It appears that this result can be obtained without it being necessary to calculate the value of the elements of the matrices $N_{ij}$ and without the need for integration of the integral 5.

There are obviously similar formulae for the magnetic field, whose value is proportional to that of the electric field and it is thus possible to obtain the same result by using measurements of the latter by means of the device 18 and amplifier 19.

FIG. 3 shows an embodiment of the process of the invention applied to prospecting in a ground wherein seismic methods have not detected the presence of an anticline, whereas stratigraphic traps which might be oil-bearing may presumable be found.

One of these traps is for example the oil impregnated sand lens 32. It is supposed that a borehole 33 has been drilled through this ground but has not traversed this sand lens.

Two measuring stations will be located on either sides of the borehole axis at the same distance therefrom. One station 34 will for example be located northwardly and the other 35 southwardly.

A recording as hereinabove indicated will be effected by raising the sonde from the bottom of the borehole to the ground surface or to the end of the cased portion of the borehole and two resistivity logs will be carried out according to the above - described process, corresponding respectively to the two measuring stations. These two logs will then be compared with a resistivity log of the ground layers along the borehole wall, as provided by a conventional method.

If there exists any lateral discrepancy, such as for example the sand lens 32 on the side of station 34, this will become apparent through a difference between the value of the resistivity obtained by following the conventional method and the value measured according to the invention at the station 34, for the same depth of the sonde. This difference will be more important when the sonde is located in the position 36 then when it is located in the position 37, since when the sonde occupies the position 36 the lens 32 is directly located on the path of the waves travelling from the transmitting sonde 36 to the receiver 34.

It will be possible, without departing from the scope of the invention to place more than two stations around the borehole or to make many measurements which may or may not be simultaneous, using stations located on the same radius at different distances $r_1, r_2, r_3 \ldots$ from the borehole axis.

By effecting this manner a sufficient number of recordings at points distributed around the borehole axis there will be obtained a map giving "electromagnetic shadows" of the underground discontinuities. This map will be of interest for defining the location of a new borehole.

In the case where the process according to the invention is carried out with an acoustical transmission, the measuring device will include a seismograph and the magnitude of the measured signal will be, as in the above case, related to that of the transmitted signal for each level of the sonde in the borehole.

It will of course be also possible, without departing from the scope of the invention, to reverse the respective locations of the transmitting and of the receiving devices, i.e. to locate on the ground surface, the device for transmitting acoustical waves or electric signals and to displace the receiving device along the borehole.

It will equally be possible to carry out the recurrence process according to the invention while maintaining a stationary position of the sonde in the bore hole and displacing the emitting or receiving point on the ground surface along a radial direction.

What we claim is:

1. A process for determining a physical property related to the nature of the ground layers surrounding a borehole comprising the steps of:

emitting from a first point a signal into the ground, said signal being propagated through the ground layers around the borehole;

receiving, at a second point in spaced relationship to the emitting point, a signal corresponding to the propagation of the emitted signal through the ground layers, said received signal being a function of the physical properties of the ground layers separating the emitting and the receiving points, one of said first and second points being located in the borehole and the other of said first and second points being located at a ground location spaced from said borehole;

producing from received signals corresponding to one and the same location of one of said emitting and receiving points and successive locations, close to each other of the other of said points, variation signals representative of the variations of said received signals from one of said locations to adjacent locations; and producing, in a step-by-step manner, from said received signals and said variation signals, the log of the value of said physical property, for successive ground layers starting from a first ground layer for which the value of said physical property is already known, said process of determining further including:

deriving the value of said physical property for any additional layer, from the value of the received signal for the location of one of said points substantially at the place of said additional layer, from the value of said variation signals at said location and from the value of said physical property for a ground layer precedent to said additional ground layer.

2. A process according to claim 1, wherein said first ground layer is constituted by an aggregate of $n$ elemental adjacent ground layers, the overall properties of which have been determined from the known properties of $n-1$ elemental adjacent ground layers by following the process described in claim 1.

3. A process according to claim 2, including the step of successively determining the overall properties of the aggregate of n elemental ground layers from the known properties of a single elemental layer.

4. A process according to claim 1, wherein said first ground layer is limited at its upper part by the ground surface.

5. A process according to claim 1, wherein said emitted signal is an electric signal.

6. A process according to claim 1, wherein said emitted signal is an acoustical signal.

7. A process according to claim 1, wherein said emitted signal is constituted of successive pulses.

8. A process according to claim 1, wherein said emitted signal is constituted of an alternating electric current.

9. A process according to claim 1, wherein said measured parameter is the time of propagation of said signal between said emitting and said receiving points.

10. A process according to claim 2, wherein said measured parameter is at least one of the three components of the electric field produced at the measuring point by the propagation of said emitted electric signal through the ground.

11. A process according to claim 2, wherein said measured parameter is at least one of the three components of the magnetic field produced at the measuring point by the propagation of said emitted electric signal through the ground.

12. A process according to claim 1, wherein different measurements are effected, corresponding to different positions of said point on the ground surface, said positions being at equal distances from said borehole axis and for each level of said point in the borehole, the values of said measured parameter which have been respectively obtained for said different positions are compared with the value of said parameter derived for a local measurement on the borehole wall, a difference between the values of said parameter corresponding respectively to said local measurement and to one of said positions of said point on the ground surface indicating the presence of a lateral geological discontinuity located on the side of said position of said point on the ground surface, with respect to the borehole axis.

13. A process for electric prospection of the ground layers surrounding a borehole drilled through the ground, comprising the steps of transmitting into these ground layers an alternating electric current, measuring at a point in spaced relationship to the point of transmission at least one component of the electric field, one of said transmitting and measuring point being stationary on the ground surface and the other displaceable along the borehole, determining for one and the same position of said point on the ground surface the magnitude $E_n$ of the electric field for a first level ($n$) of said point in the borehole, determining the variation $\Delta(E_n) = E_{n-1} - E_n$ in the magnitude of the electric field, resulting from the displacement of said point in the borehole from said first level to a second level ($n-1$) separated from said first level by a small interval, said variation defining the field gradient at said first level ($n$), determining the variation $\Delta[\Delta (E_n)]$ in said field gradient, when said point in the borehole, is displaced from said first to said second level, deriving from the so-effected measurements the ratio of the respective values of the electric conductivity of the ground layers substantially at said first and second levels, thus making it possible, gradually, knowing the value of the electric conductivity of the ground at a given level, to obtain a log of the electric conductivity as a function of depth.

14. A process for electric prospection of the ground layers surrounding a borehole drilled through the ground comprising the steps of transmitting into these ground layers an alternating electric current, measuring at a point spaced relationship to the point of transmission at least one component of the magnetic field, one of said transmitting and measuring point being stationary on the ground surface and the other displaceable along the borehole, determining for one and the same position of said point on the ground surface the magnitude $H_n$ of the electric field for a first level ($n$) of said point in the borehole, determining the variation $\Delta(H_n) = H_{n-1} - H_n$ in the magnitude of the electric field, resulting from the displacement of said point in the borehole from said first level to a second level ($n-1$) separated from said first level by a small interval, said variation defining the field gradient at said first level ($n$), determining the variation $\Delta[\Delta (Hn)]$ in said field gradient, when said point in the borehole, is displaced from said first to said second level, deriving from the so-effected measurements the ratio of the respective values of the electric conductivity of the ground layers substantially at said first and second levels, thus making it possible, gradually, knowing the value of the electric conductivity of the ground at a given level, to obtain a log of the electric conductivity as a function of depth.

* * * * *